United States Patent
Smith et al.

(10) Patent No.: US 8,615,852 B2
(45) Date of Patent: Dec. 31, 2013

(54) MAGNETIC FASTENER CLIP

(75) Inventors: Michael Walter Smith, Lake Zurich, IL (US); Daniel James Dickenson, Arlington Heights, IL (US); Mark Fleydervish, Buffalo Grove, IL (US); John Clasen, Crystal, IL (US)

(73) Assignee: Termax Corporation, Lake Zurich, IL (US)

( * ) Notice: Subject to any disclaimer, the term of this patent is extended or adjusted under 35 U.S.C. 154(b) by 168 days.

(21) Appl. No.: 12/464,867

(22) Filed: May 13, 2009

(65) Prior Publication Data
US 2010/0289288 A1    Nov. 18, 2010

(51) Int. Cl.
*F16B 47/00*    (2006.01)

(52) U.S. Cl.
USPC .............................. 24/303; 24/114.2; 24/457

(58) Field of Classification Search
USPC .................. 24/203, 114.2, 457, 3; 248/206.5, 248/309.4, 683, 537
See application file for complete search history.

(56) References Cited

U.S. PATENT DOCUMENTS

| | | | |
|---|---|---|---|
| 2,940,361 A | 6/1960 | Francisco | |
| 3,025,559 A | 3/1962 | Basinger | |
| 3,244,443 A | 4/1966 | Rodgers | |
| 3,261,631 A | 7/1966 | Alessi | |
| 3,300,239 A | 1/1967 | Dinkin | |
| 3,330,066 A | 7/1967 | Crawford | |
| 3,781,047 A | 12/1973 | Surko, Jr. | |
| 4,303,054 A | 12/1981 | Lore | |
| 4,825,526 A | 5/1989 | Shenier et al. | |
| 4,907,769 A | 3/1990 | Hunley, Jr. et al. | |
| 5,042,867 A * | 8/1991 | Crotty et al. | ................. 296/97.8 |
| 5,082,317 A | 1/1992 | Delaney, Jr. | |
| 5,187,744 A | 2/1993 | Richter | |
| 5,280,991 A | 1/1994 | Weiland | |
| 5,687,945 A | 11/1997 | Lee | |
| 5,983,464 A | 11/1999 | Bauer | |
| 6,857,809 B2 | 2/2005 | Granata | |
| 6,895,642 B2 | 5/2005 | Huang | |
| 7,217,059 B1 | 5/2007 | Rudduck | |
| 7,241,069 B2 | 7/2007 | Richter | |
| 7,306,190 B2 | 12/2007 | Tisol, Jr. | |
| 7,435,031 B2 | 10/2008 | Granata | |
| 2006/0127172 A1 | 6/2006 | Tisol, Jr. | |

FOREIGN PATENT DOCUMENTS

| | | |
|---|---|---|
| GB | 1056797 | 1/1967 |
| JP | 53-4919 | 1/1978 |
| JP | 59-145860 | 8/1984 |
| JP | 62-152945 | 7/1987 |

(Continued)

*Primary Examiner* — Dennis Pedder
(74) *Attorney, Agent, or Firm* — CGIP Law (57) ABSTRACT

A magnetic fastener clip includes a base and an umbrella positioned on the base. A boss is attached to the umbrella and extends outwardly from the umbrella and away from the base. The magnetic fastener has a hole with a diameter to receive the boss. The boss is welded to hold the magnetic fastener against the umbrella. An optional carrier is attached to the base to provide additional height for suitable applications. The umbrella is positioned on the base or is attached to the carrier and positioned opposite the base. The boss is attached to the magnetic fastener such that the umbrella flexes to permit the magnetic fastener to pivot about the boss. The magnetic fastener clip adapts to different surface curvatures and thicknesses. The magnetic fastener clip is operative for blind attachment into a structure, such as a vehicle chassis i.e. roof.

19 Claims, 6 Drawing Sheets

(56) References Cited

FOREIGN PATENT DOCUMENTS

| JP | 6-6116 | 1/1994 |
| JP | 06-228507 | 8/1994 |
| JP | 08-132981 | 5/1996 |
| JP | 09-264306 | 10/1997 |
| JP | 10-131926 | 5/1998 |
| JP | 11-178172 | 7/1999 |
| JP | 2002-059793 | 2/2002 |

* cited by examiner

MAGNETIC FASTENER CLIP

FIELD OF THE INVENTION

The invention relates generally to devices for fastening objects, and more particularly to a magnetic fastener clip for insertion into an engagement structure, such as a vehicle chassis, a hollow substrate, a wall, a plate or any suitable surface.

BACKGROUND OF THE INVENTION

A number of devices and fasteners are currently available for fastening panels such as body panels and automobile interior trimpiece panels to the chassis of a vehicle. Fastener clips are used in automobile assemblies to secure body panels such as headliners, interior panels and the like to roofs, door structures and body panels. As used herein, a body panel refers to, for example, any interior or exterior structure on a vehicle, a plastic or metal interior trim piece or any interior trimpiece. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

Interior automobile fasteners are known to retain a headliner in position within the automobile roof. However, many of these fasteners only fasten around the periphery of the headliner. While a dome light or the like may be located in the middle of the roof area, extensive expanses of the headliner are not supported or fastened by such structures. Also, these fasteners allow the headliner to sag, providing an aesthetically unacceptable appearance.

It is known to use fastener clips to further secure headliners to automobile roofs. An automobile headliner is typically made of cloth, foam, plastic or other suitable material and generally includes a suitable substrate layer. A fastener clip is secured to the substrate by an adhesive, such as glue, and is then attached to the underlying roof structure.

Attaching the headliner to the interior of the roof typically requires securing clips already fastened to a headliner assembly into a hole, slot or mounting point on the roof. At least some of the clips require blind insertion and installation of the fasteners because the installer is not able to view the fastener clip or the mounting point on the roof.

Fastener clips are known for attaching body panels to an automobile chassis. Magnets may be used to reduce the problem of the blind fastener application. For example, fastener clips are known that attach to an automobile headliner or the like using adhesive, and which firmly connects to a magnet. Thus, magnetic fastening clips do not require aligning a fastener with a mating hole and attachment of the fastener to the hole.

Another known clip has a base, a dome spaced from the base and a plurality of supports between the base and the dome. A hollow post extends outwardly from the dome and includes at least one deflectable portion having an outward protuberance thereon. A pin is substantially aligned with the post and connected thereto by at least one frangible link. A frangible link between the pin and the clip is adapted to rupture when the pin is driven. However, since the pin requires alignment and insertion during manufacture, assembly is time consuming labor intensive and expensive.

These known clips however are neither sufficiently rugged nor flexible for example on an automobile assembly line that can be somewhat harsh. These fastening clips typically do not have a long useful life to support the headliner and prevent staking throughout the anticipated life expectancy of the vehicle. During installation the headliner can be moved, stretched or twisted inconsistently. Further, the fastener device is typically required to secure the panel to the chassis that may have sheet metal with different amounts of curvature or thicknesses throughout. If the sheet metal varies in curvature or thickness or if for example, tolerances in production of the vehicle chassis or in the trim-piece, i.e. headliner exist, then engagement of one fastener to the roof may not provide suitable magnetic engagement or will otherwise result in movement. Further, less than all fasteners make engagement with the roof. Twisting of the headliner will be likely more prevalent because less than all contact points are actually made with the roof. As a result, saging, wear, squeaks, rattles, buzzing, corrosion and loss of elasticity and loss of sealing may result, especially after years of vehicle operation and exposure to vibration and other environmental conditions. As such, these fastener clips do not provide sufficient flexibility.

Once installed, during use of the automobile, the headliner is sometimes contacted or pushed by passengers. Also, the fastener device is typically required to secure the headliner under a variety of environmental conditions, such as in the presence of vibration at various levels of amplitude and frequency. For example, the fastener device should prevent or minimize the amount of buzzing, rattling or any other type of noise that may cause attention to the occupants of the vehicle or otherwise weaken the attachment. Further yet, another requirement of the fastener device is that the fastener device accommodates various levels of sheet metal curvature, thicknesses, and production tolerances, such as various dimensions amongst, for example, the body panels as well as the vehicle chassis. Conventional fastener devices typically do not adequately fasten to a range of sheet metal thicknesses and do not minimize or eliminate buzzing and rattling and do not sufficiently accommodate variations in production tolerances. As a result, these clips can break or otherwise fail under these conditions. If the fastener clip is broken after installation of the headliner, sagging can occur again presenting the aesthetically undesirable appearance. Further, replacement of an installed, broken clip can be difficult.

DETAILED DESCRIPTION OF THE PREFERRED EMBODIMENTS

A magnetic fastener clip includes a base and an umbrella positioned on the base. A boss is attached to the umbrella and extends outwardly from the umbrella and away from the base. The magnetic fastener has a hole with a diameter to receive the boss. The boss is welded to hold the magnetic fastener against the umbrella. An optional carrier is attached to the base to provide additional height for suitable applications. The umbrella is positioned on the base or is attached to the carrier and positioned opposite the base. The boss is attached to the magnetic fastener such that the umbrella flexes to permit the magnetic fastener to pivot about the boss. The magnetic fastener clip adapts to different surface curvatures and thicknesses. The magnetic fastener clip is operative for blind attachment into a structure, such as a vehicle chassis i.e. roof.

Among other advantages, the magnetic fastener clip relatively easily facilitates attachment of a body panel, such as headliner with the engagement structure, such as the vehicle roof, such that the magnetic fastener clip may be used with different sheet metal curvatures and/or thicknesses. For example, a vehicle roof may have different sheet metal curvatures and thicknesses at various parts of the vehicle. Since the fastener clip adapts automatically to different sheet metal curvatures and thicknesses, the same fastener clip may be used throughout the vehicle thus eliminating the need for specific fastener clips for specific roof curvatures and thicknesses.

According to one embodiment, the boss is attached to the magnetic fastener such that the umbrella is operative to flex to permit the umbrella to pivot about the boss. A hole diameter, a boss diameter, a magnetic fastener thickness and/or a boss thickness are sized to allow the magnetic fastener to pivot about the boss. Thus, the umbrella support structure adapts to variations of sheet metal roundness and thicknesses thus allowing the magnet fastener to pivot and to maintain a high level of extraction force. For example, during installation the engagement magnet continuously adapts to variations in curvature and dimensions of the vehicle roof and/or in the body or headliner panel. Thus, only a single magnetic fastener clip need be used with a vehicle or application even if the curvature or thickness of the sheet metal varies substantially. According to another embodiment, the boss is welded to the magnetic fastener to securely fasten the headliner to the roof and provide long reliable life.

The magnet, along with an optional carrier, permits relatively easy insertion of the magnetic fastener clip into a vehicle chassis roof while providing a relatively high level of extraction force from the vehicle roof. Assembly of the body panel onto the vehicle chassis is very easy and requires no or a relatively low level of insertion force compared to the extraction force, and as a result provides many ergonomic advantages. For example, the relatively low level of insertion force is particularly advantageous for assembly line operators who repetitively insert body panels onto the vehicle chassis. The relatively low level of insertion force required for blindly inserting the body panel into the vehicle chassis may result in fewer injuries to the assembly workers, including injuries related to repetitive stress syndrome. Further by eliminating or reducing the number of different fasteners for different sheet metal curvatures and thicknesses, confusion during assembly is eliminated since the same type fastener may be used for all or most body panel fasteners. Thus, an assembly worker need not worry about selecting the wrong fastener.

The relatively high level of extraction force, characteristic of the magnetic fastener clip, securely attaches the body panel, such as a headliner, to the vehicle chassis. Further, the fastener clip continuously adapts to changes in environmental conditions such as vehicle flexing, pushing by passengers, vibration and thermal expansion. For example, the magnetic fastener clip may adapt to changes in thermal expansion, especially due to the differences in thermal expansion rates between dissimilar metals with respect to the vehicle chassis components and/or between plastic components such as the interior trim panels attached to the metal vehicle chassis. The fastener clip may also fasten to plastic and/or metal engagement structures. The fastener clip may be made of anti-corrosive material such as plastic or treated metal to provide long reliable service life.

Yet another advantage is that the magnetic fastener clip is relatively easy to manufacture using relatively inexpensive manufacturing processes and materials. The use of the magnetic fastener clip decreases production costs, increases worker productivity and efficiency, improves reliability and quality and decreases overall vehicle assembly, warranty and maintenance costs. The magnetic fastener clip securely attaches a body panel such as a headliner to the vehicle roof, such that the magnetic fastener clip improves reliability both in the short term and in the long term, while further improving vehicle safety and quality.

Figure 1:
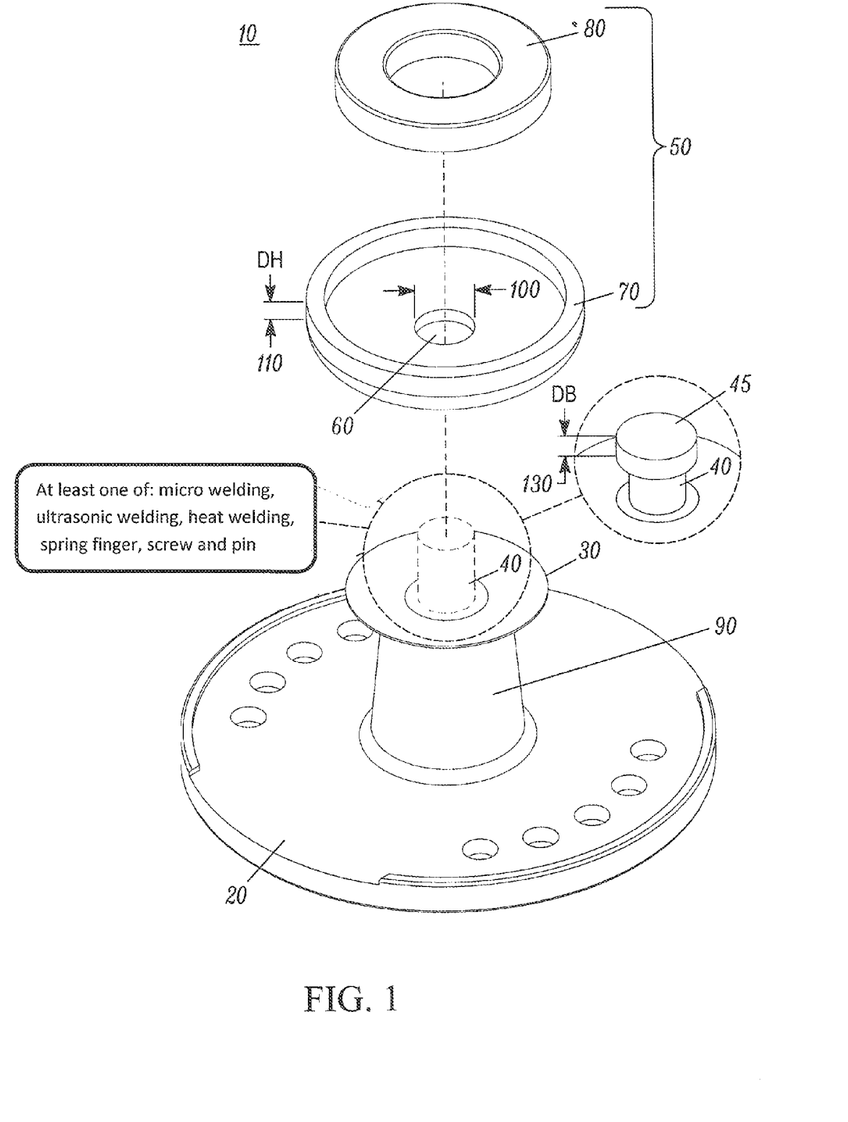
FIG. 1 is an exploded view of a magnetic fastener clip according to one embodiment.
Figure 11:
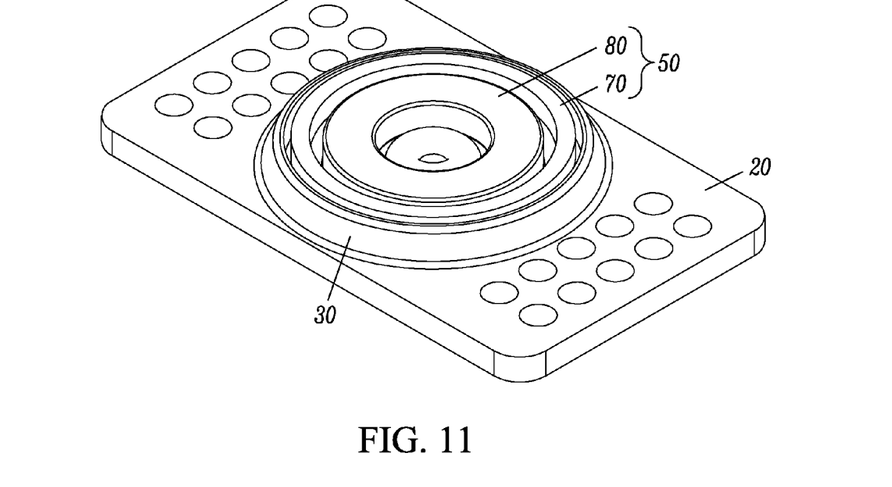
FIG. 11 is a perspective view of a magnetic fastener clip having a lower profile in accordance with an exemplary embodiment.
Figure 12:
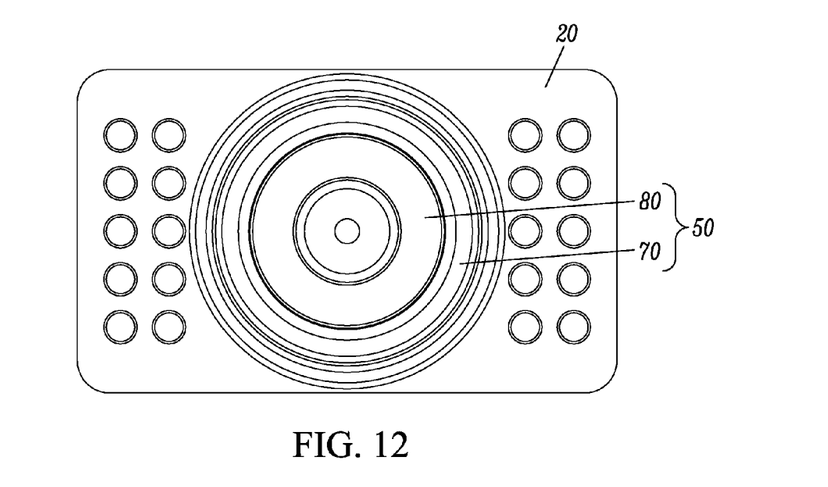
FIG. 12 is a top view of a magnetic fastener clip having a lower profile in accordance with an exemplary embodiment.

FIG. 1 is a perspective view of a magnetic fastener clip 10 according to one embodiment. The fastener clip 10 includes a base 20 and an umbrella 30 attached to the base 20 via an optional carrier 90 or alternatively the umbrella is positioned on the base 20 itself as seen in FIG. 11. Depending on the space requirement between the roof and the headliner, the height of the magnetic fastener 50 may be increased with the optional carrier 90 attached to the base 20 at one end and at the umbrella 30 at the other end of the optional carrier 90. A boss 40 is attached to the umbrella 30 and extends outwardly from the umbrella 30 and away from the base 20. A magnetic fastener 50 has a hole 60 with a diameter to receive the boss 40. According to one embodiment, the boss 40 is welded to the magnetic fastener 50 to form a weld for fastening the magnetic fastener 50 to the boss 40.

According to one embodiment, the magnetic fastener 50 further comprises a holder 70 and a magnet 80. The magnetic fastener 50 may be a single piece (i.e. a magnet without a holder) or multi-piece device. Although the fastener clip 10 is shown in FIGS. 1-13 with a round magnetic fastener 50 any suitable shape may be used including oval, square, rectangular, triangular or polygon. The magnetic fastener 50 has a hole 60 with a diameter 100 to receive the boss 40 having a diameter 120. The magnetic fastener 50 has a magnetic fastener thickness 110.

Figure 2:
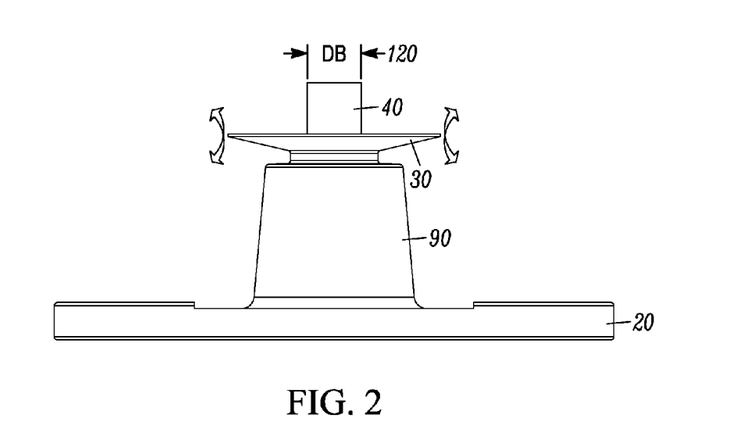
FIG. 2 is a side view of a portion of the magnetic fastener clip according to another embodiment.

FIG. 2 is a side view of the magnetic fastener clip 10 according to another embodiment. The boss 40 having a diameter 120 is attached to the magnetic fastener 50 having a hole 60 with a diameter 100 such that the umbrella 30 is operative to flex to permit the umbrella 30 to pivot about the boss 40. According to one embodiment, a hole diameter 100, a magnetic fastener thickness 110, a boss diameter 120, and/or a boss height 130 are sized to allow the umbrella 30 to pivot about the boss 40 while remaining securely fastened to the boss 40. Any suitable combination of parameters may be sized to permit the desired amount of pivoting according for example to the curvature of an automobile body panel such as the roof. For example the magnetic fastener thickness "DH" 110, the boss height 130 "DB" and/or a boss diameter 120, are sized to allow the umbrella 30 and the magnetic fastener 50 to pivot about the boss 40.

Figure 3:
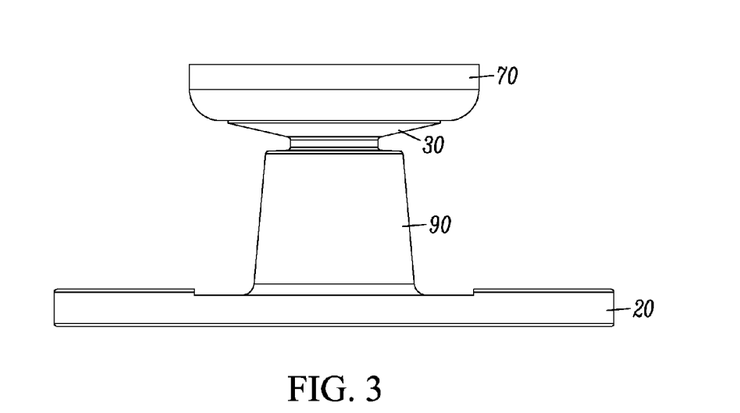
FIG. 3 is a side view of the magnetic fastener clip according to one embodiment.
Figure 4:
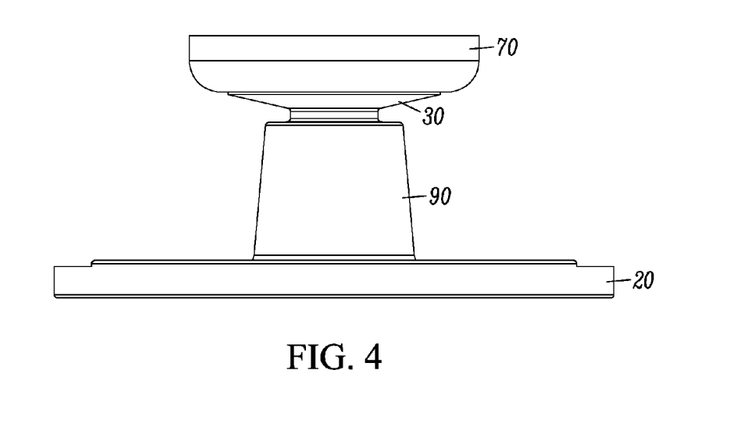
FIG. 4 is another side view of the magnetic fastener clip shown in FIG. 2 rotated 90 degrees.

FIGS. 3 and 4 are side views of the magnetic fastener clip 10 according to one embodiment. FIG. 4 is another side view of the magnetic fastener clip 10 shown in FIG. 3 rotated 90 degrees. As further shown in FIGS. 9, 10, 11 and 13, the umbrella 30 shown is in spaced apart relation from the base 20, such that the umbrella 30 is positioned over and above the base 20 so as to define an open area. As also shown in FIGS. 7, 8, 9 and 10, the height of the carrier 90, umbrella 30, base 20 or magnet holder 70, or any suitable combinations may be sized to provide the appropriate spacing between the body panel, such as a headliner and the chassis such as the roof.

Figure 5:
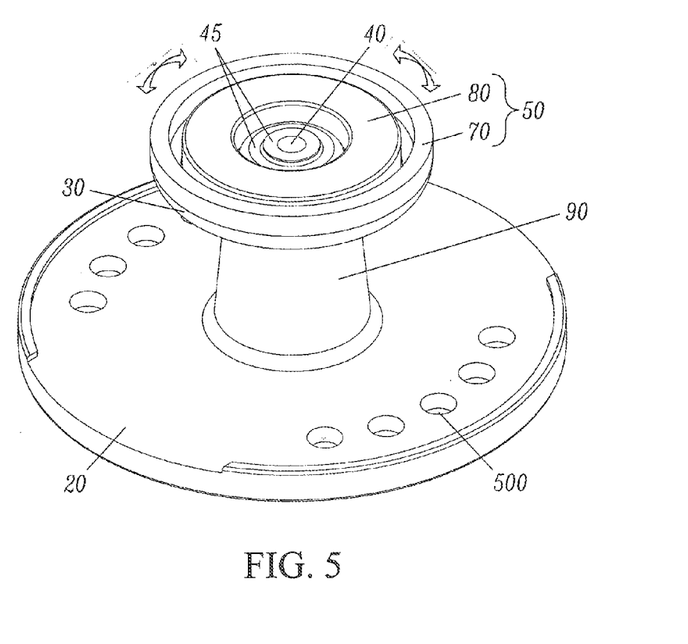
FIG. 5 is a perspective view of the magnetic fastener clip according to one embodiment.

FIG. 5 is a perspective view of the magnetic fastener clip 10. The magnetic fastener clip 10 may be pre-assembled by attaching the magnetic fastener clip 10 to a body panel, such as a headliner, to form a body panel assembly (not shown). The base 20 according to one embodiment may further comprise base holes 500. The base holes 500 permit attachment to the body panel by applying glue or any suitable fastener. The body panel assembly thus comprises a body panel attached to the magnetic fastener clip 10 attached via glue or suitable fastener such as a screw, bolt, rivet or any suitable fastener to attach the body panel to the magnetic fastener clip 10. The body panel assembly is operatively inserted as a single unit into a structure, such as a vehicle chassis, roof or frame to form a vehicle with the magnetic clip. The magnetic fastener clip 10 adapts to different chassis curvatures such that an angle between the magnetic fastener 50 and the base 20 is operative to vary continuously.

According to one embodiment, the fastener clip 10 is made of: magnetic steel or any suitable metal. The body panel may be constructed from plastic or from any suitable material such as plastic, vinyl, closet, wood, steel, aluminum, magnesium, carbon fiber or any suitable material.

According to one embodiment, the holes 500 formed in base 20 may have any suitable shape, such as for example: tapered, straight, curved or any suitable shape. Tapered holes that have a larger diameter on the top side of the base 20 (closest to the magnetic fastener 50) than on the bottom side (mating with the body panel) filled with glue will further provide a mechanical connection as well as the chemical connection as a result of the adhesive properties of the glue.

Figure 6:
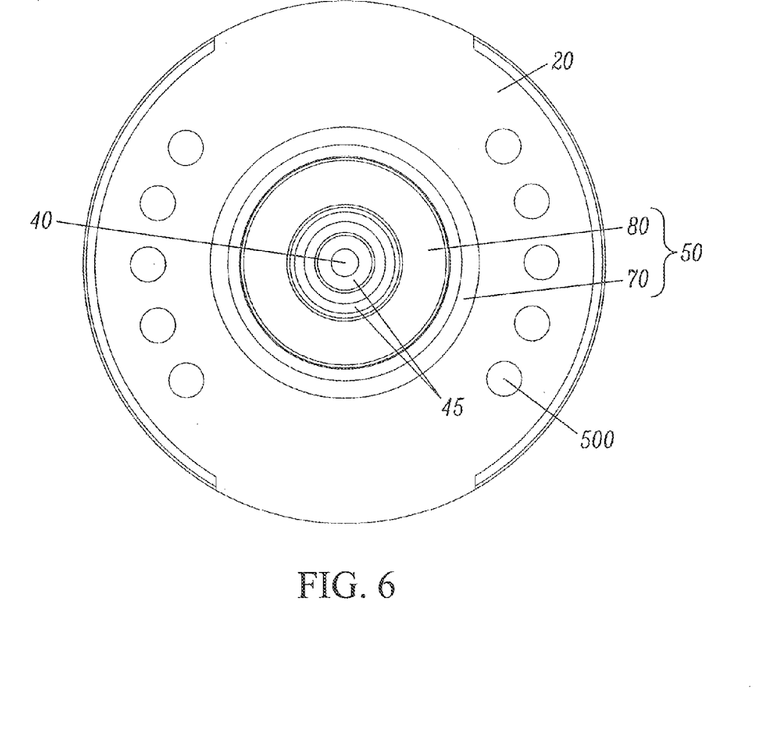
FIG. 6 is a top view of the magnetic fastener clip prior to engagement to a frame.
Figure 7:
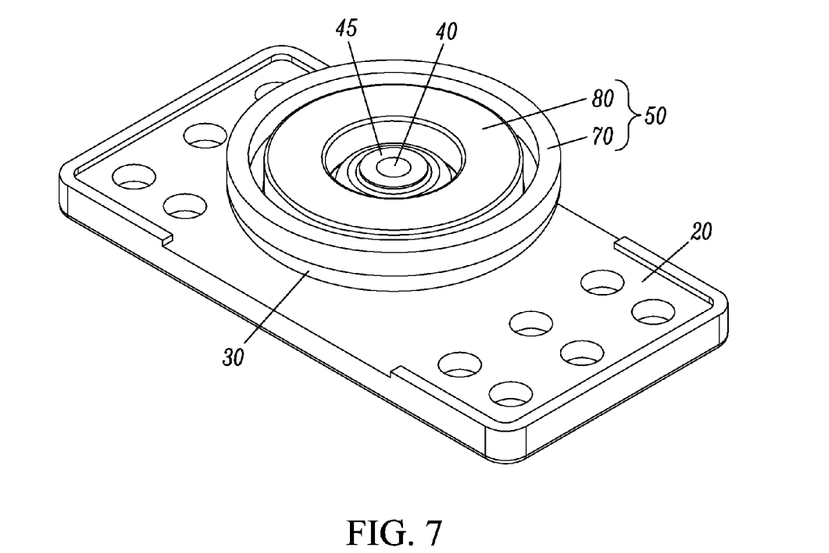
FIG. 7 is a perspective view of the magnetic fastener clip in accordance with an exemplary embodiment.
Figure 8:
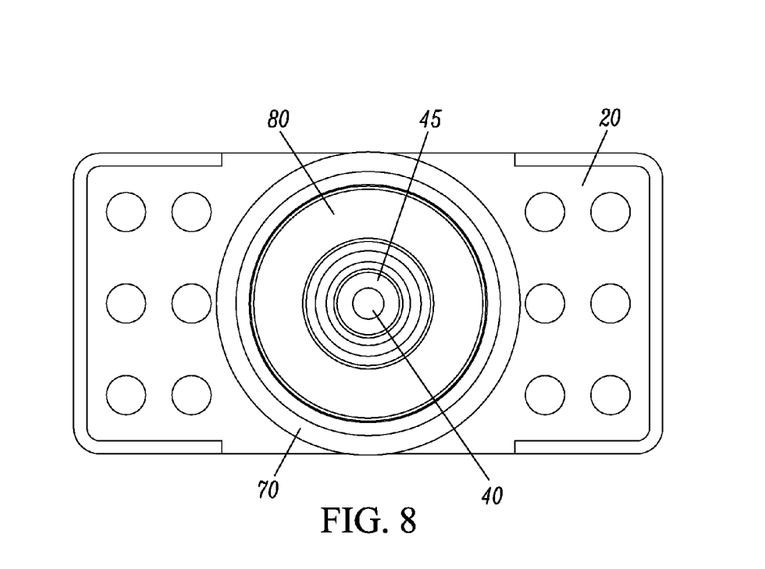
FIG. 8 is a top view of the magnetic fastener clip in accordance with an exemplary embodiment.
Figure 9:
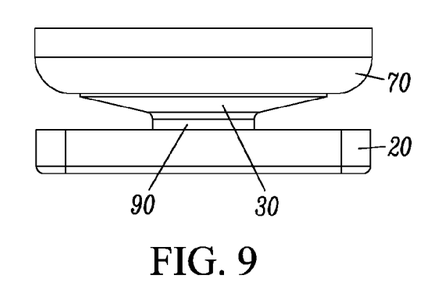
FIG. 9 is a side view of the magnetic fastener clip in accordance with an exemplary embodiment.
Figure 10:
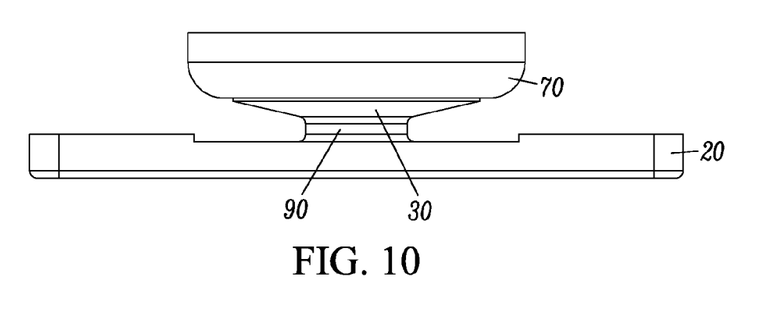
FIG. 10 is a side view of the magnetic fastener clip shown in FIG. 9 rotated 90 degrees.

FIG. 6 is a top view of the magnetic fastener clip 10 shown in FIG. 5. As previously explained, the boss 40 may be ultrasonically welded to hold the magnetic fastener 50. According to an alternative embodiment, the boss 40 attaches the magnetic fastener 50 to the umbrella 30 by: micro welding, ultrasonic welding (an ultrasonic horn melts the plastic boss 40 in a pre-determine location to form a boss head 45), heat welding, spring finger, screw and pin or any suitable combination thereof.

The umbrella 30, boss 40, carrier 90, holder 70 and base 20, or any combination of components may be made from: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene (ABS), or any suitable material and combination thereof.

According to one embodiment, the umbrella 30, boss 40 and base 20 are made from Polypropylene. Polypropylene or polypropene (PP) is a thermoplastic polymer. Typical commercial polypropylene is isotactic and has an intermediate level of crystallinity between that of low density polyethylene (LDPE) and high density polyethylene (HDPE); its Young's modulus is also intermediate. PP is normally tough and flexible, especially when copolymerised with ethylene. This allows polypropylene to be used as an engineering plastic, and thus may be used in place of other materials such as ABS, acrylic or certain other plastics. Polypropylene is reasonably economical, and has good resistance to fatigue.

Polypropylene has a melting point of ~160° C. (320° F.), as determined by Differential scanning calorimetry (DSC) and thus is suitable for injection molding. The MFR (Melt Flow Rate) or MFI (Melt Flow Index) is a measure of PP's molecular weight. This helps to determine how easily the melted raw material will flow during processing. Higher MFR PPs fill the plastic mold more easily during the injection or blow molding production process. As the melt flow increases, however, some physical properties, like impact strength, may decrease and thus melt flow may be controlled to maintain a high degree of strength.

There are three general types of PP: homopolymer, random copolymer and block copolymer. The comonomer used is typically ethylene. Ethylene-propylene rubber or EPDM added to PP homopolymer increases its low temperature impact strength. Randomly polymerized ethylene monomer added to PP homopolymer decreases the polymer crystallinity and makes the polymer more transparent.

Manufacturing

Melt processing of polypropylene can be achieved via extrusion and molding. Injection molding may be used to obtain the desired shape. The related techniques of blow molding and injection-stretch blow molding may also used, which involve both extrusion and molding.

PP offers the ability to tailor grades with specific molecular properties and additives during its manufacture. For example, antistatic additives can be added to help PP surfaces resist dust and dirt. Many physical finishing techniques can also be used on PP, such as machining. Surface treatments can be applied to PP parts in order to promote adhesion of printing ink and paints.

Plastics

According to another embodiment, the umbrella 30, carrier 90, boss 40 and base 20 may be made from any suitable plastic including: Cross-linked polyethylene (PEX or XLPE)•Polyethylene (PE)•Polyethylene terephthalate (PET or PETE)•Polyphenyl ether (PPE)•Polyvinyl chloride (PVC)•Polyvinylidene chloride (PVDC)•Polylactic acid (PLA)•Polypropylene (PP)•Polybutylene (PB)•Polybutylene terephthalate (PBT)•Polyamide (PA)•Polyimide (PI)•Polycarbonate (PC)•Polytetrafluoroethylene (PTFE)•Polystyrene (PS)•Polyurethane (PU)•Polyester (PEs)•Acrylonitrile butadiene styrene (ABS)•Polymethyl methacrylate (PMMA)•Polyoxymethylene (POM)•Polysulfone (PES)•Styrene-acrylonitrile (SAN)•Ethylene vinyl acetate (EVA))•and Styrene maleic anhydride (SMA).

Acetal

According to another embodiment, the umbrella 30, carrier 90, boss 40 and base 20 may be made from polyoxymethylene plastic or any suitable acetal based plastics. Acetal based plastics are chemically resistant, have very low water absorption, are resistant to hydrolysis by base.

Figure 13:
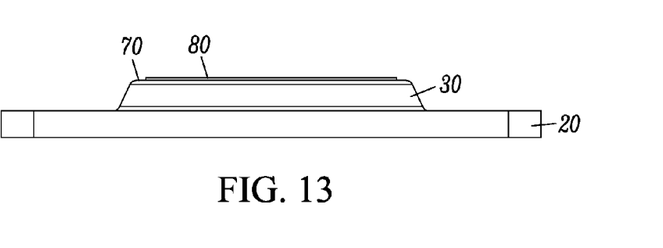
FIG. 13 is a side view of a magnetic fastener clip having a lower profile in accordance with an exemplary embodiment.

As shown in FIGS. 11 and 13, the umbrella 30 may be flush with the base 20. According to this embodiment, there is relatively little or no open area between the base 20 and the umbrella 30. This may be suitable for short height applications where there is little or a relatively short distance between the chassis and body panel, i.e. headliner and roof. Thus a body panel assembly may include magnetic fasteners of various heights. For example the magnetic fasteners of various heights may be used where the distance between the headliner and roof varies.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A magnetic fastener clip comprising:
   a base;
   an umbrella positioned on the base and operative to spin about the boss;
   a boss attached to the umbrella and extending outwardly from the umbrella and away from the base; and
   a magnetic fastener having a hole with a diameter to receive the boss, the boss is welded to hold the magnetic fastener against the umbrella.

2. The magnetic fastener clip of claim 1 wherein at least one of: a hole diameter, a boss diameter, a magnetic fastener thickness and a boss height are sized to allow the magnetic fastener to pivot about the boss.

3. The magnetic fastener clip of claim 1 wherein the boss is welded to form a weld so as to fasten the magnetic fastener to the boss.

4. The magnetic fastener clip of claim 1 wherein at least one of: the umbrella, boss and base are comprised of at least one of: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene (ABS).

5. The magnetic fastener clip of claim 1 wherein the magnetic fastener further comprises a holder and a magnet.

6. A magnetic fastener clip comprising:
   a base;
   a carrier attached to the base;
   an umbrella attached to the carrier and positioned opposite the base;
   a boss attached to the umbrella and extending outwardly from the umbrella and away from the base; and
   a magnetic fastener having a hole with a diameter to receive the boss, the boss attaches the magnetic fastener to the umbrella such that the umbrella is operative to flex to permit the magnetic fastener to pivot about the boss.

7. The magnetic fastener clip of claim 6 wherein at least one of: a hole diameter, a boss diameter, a magnetic fastener thickness and a boss height are sized to allow the umbrella to pivot about the boss.

8. The magnetic fastener clip of claim 6 wherein at least one of: a magnetic fastener thickness, a boss height and a boss thickness, are sized to allow the magnetic fastener to pivot about the boss.

9. The magnetic fastener clip of claim 6 wherein the umbrella pivots about the boss according to a curvature of an automobile body panel.

10. The magnetic fastener clip of claim 6 wherein the umbrella is in spaced apart relation from the base, such that the umbrella is positioned over and above the base so as to define an open area.

11. The magnetic fastener clip of claim 1 wherein the umbrella is flush with the base.

12. The magnetic fastener clip of claim 6 wherein the boss attaches the magnetic fastener to the umbrella by at least one of: micro welding, ultrasonic welding, heat welding, spring finger, screw and pin.

13. The magnetic fastener clip of claim 6 wherein at least one of: the umbrella, boss and base are comprised of at least one of: Polypropylene, glass fill, acetal, plastic, vinyl, rubber, plastisol, plastic, acetal, polyacetal, polyoxymethylene, nylon, fiberglass and carbon fiber and Acrylonitrile butadiene styrene (ABS).

14. The magnetic fastener clip of claim 6 wherein the umbrella spins about the boss.

15. The magnetic fastener clip of claim 6 wherein the magnetic fastener further comprises a holder and magnet.

16. A vehicle and magnetic clip comprising:
    a vehicle chassis having a body panel;
       a magnetic fastener clip comprising:
          a base;
          a carrier attached to the base;
          an umbrella attached to the carrier and positioned opposite the base;
          a boss attached to the umbrella and extending outwardly from the umbrella and away from the base; and
          a magnetic fastener operatively coupled to the body panel having a hole with a diameter to receive the boss, the boss holds the magnetic fastener such that the umbrella flexes to permit magnetic fastener to pivot about the boss.

17. The vehicle and magnetic clip of claim 16 wherein at least one of: a hole diameter a boss diameter, a magnetic fastener thickness and a boss height are sized to allow the umbrella to pivot about the boss.

18. The vehicle and magnetic clip of claim 16 wherein a magnetic fastener thickness and a boss thickness, are sized to allow the magnetic fastener to pivot about the boss.

19. The vehicle and magnetic clip of claim 16 wherein the umbrella pivots about the boss according to a curvature of an automobile body panel.

* * * * *